US008832694B2

(12) United States Patent
Kang et al.

(10) Patent No.: US 8,832,694 B2
(45) Date of Patent: Sep. 9, 2014

(54) METHOD AND SYSTEM FOR THE DYNAMIC ALLOCATION OF RESOURCES BASED ON A MULTI-PHASE NEGOTIATION MECHANISM

(75) Inventors: Dhanwant Singh Kang, Raleigh, NC (US); Hua Liu, Fairport, NY (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 255 days.

(21) Appl. No.: 13/331,246

(22) Filed: Dec. 20, 2011

(65) Prior Publication Data

US 2013/0160018 A1    Jun. 20, 2013

(51) Int. Cl.
*G06F 9/46* (2006.01)
*G06F 9/455* (2006.01)

(52) U.S. Cl.
USPC .................... 718/100; 718/103; 718/104

(58) Field of Classification Search
None
See application file for complete search history.

(56) References Cited

U.S. PATENT DOCUMENTS

| | | | |
|---|---|---|---|
| 7,197,040 B2 * | 3/2007 | Bressoud et al. | 370/401 |
| 2005/0278240 A1 * | 12/2005 | Delenda | 705/37 |
| 2009/0249350 A1 * | 10/2009 | Senders et al. | 718/104 |
| 2009/0282415 A1 * | 11/2009 | An et al. | 718/104 |
| 2012/0042320 A1 * | 2/2012 | Jamjoom et al. | 718/104 |

OTHER PUBLICATIONS

Carmel, D. et al., "Exploration Strategies for Model-based Learning in Multi-agent Systems," *Autonomous Agents and Multi-agent Systems* (1999) 2:141-172.

Hang, C.-W. et al., "From Quality to Utility: Adaptive Service Selection Framework," *Proceedings of the 8th International Conference on Service Oriented Computing (ICSOC)* Dec. 2010, San Francisco, 15 page, csc.ncsu.edu/faculty/mpsingh/papers/mas/ICSOC-10-QoS.pdf.

Jain, R. K. et al., "A Quantitative Measure of Fairness and Discrimination for Resource Allocation in Shared Computer Systems," *DEC Research Report TR-301* Sep. 26, 1984, 38 pages.

Mailler, R. et al., "Cooperative Negotiation for Soft Real-Time Distributed Resource Allocation," *AAMAS* Jul. 14-18, 2003, Melbourne, Australia, 8 pages.

Mudgal, C. et al.,"Bilateral Negotiation with Incomplete and Uncertain Information: a Decision-Theoretic Approach using a Model of the Opponent," *CIA '00 Proceedings of the 4th International Workshop on Cooperative Information Agents IV, The Future of Information Agents in Cyberspace* (2000) Springer-Verlag, London, UK, 12 pages.

Shafique, M. et al., "Minority-Game-based Resource Allocation for Run-Time Reconfigurable Multi-Core Processors," *Design, Automation & Test* (2011) Europe Conference & Exhibition. Mar. 14-18, 6 pages.

* cited by examiner

*Primary Examiner* — Meng An
*Assistant Examiner* — Bradley Teets
(74) *Attorney, Agent, or Firm* — Luis M. Ortiz; Kermit D. Lopez; Ortiz & Lopez, PLLC (57) ABSTRACT

A system and method for the dynamic allocation of resources based on multi-phase negotiation mechanism. A resource allocation decision can be made based on an index value computed by a selection index function. A negotiation process can be performed based on a schedule, a number of resources, and a price of resources. A user requesting a resource for a low priority task can negotiate based on the schedule, the user demanding the resource for a medium priority task can negotiate based on the schedule and/or the number of resources, and filially the user requesting the resource for a high priority job can successfully negotiate based on per unit resource price. The multi-phase negotiation mechanism motivates the users to be cooperative among them and improves a cooperative behavior coefficient and an overall user satisfaction rate.

15 Claims, 7 Drawing Sheets

METHOD AND SYSTEM FOR THE DYNAMIC ALLOCATION OF RESOURCES BASED ON A MULTI-PHASE NEGOTIATION MECHANISM

TECHNICAL FIELD

Embodiments are generally related to resource allocation methods and systems. Embodiments are also related to service sharing and process management applications. Embodiments are additionally related to the allocation of resources based on a multi-phase negotiation mechanism.

BACKGROUND OF THE INVENTION

Resource allocation is utilized in a number of applications and is typically employed to assign available resources in a cost effective manner. Resource allocation may be determined utilizing, for example, algorithms and computer programs applied to a specific domain to automatically and dynamically distribute resources. Resource allocation is useful in a number of areas including, for example, service sharing, shared hosting platforms, and project management.

The project management domain involves the planning, organizing, and securing of resources in order to successfully complete specific project goals and objectives. In project management, resource allocation typically includes the scheduling of activities and resources required while taking into consideration both the resource availability and the project time. Resource allocation can thus involve the use of a large number of algorithmic solutions to allocate problems.

Demand patterns, however, may undergo permanent or seasonal variations in demand during the life cycle of a process due to changes in, for example, customer and user requirements. Additionally, changes in the execution speed of particular processes may result as process operators become more proficient at their tasks or begin performing new types of tasks. As a consequence, a process may move into a state of sub-optimal performance. Such changes can render the initial resource allocation of project sub-optimal, which can result in below-par performance of the intended process. The actual number of resources required may be higher or lower than the number initially allocated as a part of the project management process.

Conventional models for allocating resources include, for example, an even resource distribution, a highest priority first, a shortest job first, and a first come first serve. Such resource allocation models either focus on a system "fairness" or system throughput measurement. The "fairness" measure (e.g., a fairness index) can be calculated utilizing Jain's fairness index and a max-min ratio. The Jain's fairness index is only efficient for a homogenous user demand (i.e., user having similar demand and equal priority). The max-min ratio mechanism does not lead to precise evaluation of the fairness measure because it considers only the maximum and minimum allocations while computing the fairness measure.

For example, the even resource distribution approach is only efficient for the homogenous user demand so that the resources can be allocated evenly. The fairness measure of the even resource distribution allocation can be computed utilizing the Jain's fairness index as indicated in equation (1) as follows:

$$f(x) = \frac{\left[\sum_{i=1}^{n} x_i\right]^2}{\sum_{i=1}^{n} x_i^2} \quad (1)$$

According to the definition of the Jain's fairness index $f(x) \in [0,1]$, where value of 0 implies least fair and value of 1 implies maximum fair. Such fairness model can be applied to the user having similar demand and doesn't yield high system throughput. The highest priority first approach offers a high throughput solution, however, it is not fair in cases where $R<<D$ where R represents total available resources and D is the total demand of all the users. Similarly, the shortest job first approach and the first come first serve algorithm offers partially efficient solutions which are either fair or yield high throughput. Additionally, such prior art models either utilize a price negotiation or a demand negotiation based on single variable such as, for example, number of resources.

Based on the foregoing, it is believed that a need exists for an improved system and method for dynamically allocating resources based on multiphase negotiation mechanism, as will be described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved process management systems and methods.

It is another aspect of the disclosed embodiments to provide for an improved system and method for dynamically allocating resources based on multi-phase negotiation mechanism.

The aforementioned aspects and other objectives and advantages can now be achieved as described herein. A system and method for the dynamic allocation of resources based on multi-phase negotiation mechanism is disclosed. A resource allocation decision can be rendered based on an index value computed via a selection index function. A negotiation process can be performed based on a schedule, a number of resources, and a price of resources. A user requesting a resource for a low priority task can negotiate based on the schedule, the user demanding the resource for a medium priority task can negotiate based on the schedule and/or the number of resources, and finally the user requesting the resource for a high priority job can successfully negotiate based on per unit resource price. The multi-phase negotiation mechanism motivates the users to be cooperative among them and improves a cooperative behavior coefficient and an overall user satisfaction rate. Such resource allocation approach provides a Pareto optimal solution without implementing market mechanisms and leads to high user satisfaction and retention rates.

The negotiation based on schedule with respect to each user can be performed by considering a selection index, a user demand, and a demand schedule tuple. The user demand schedule represents the number of resources required by the user within a specified time frame. An actual schedule can be analyzed and a new schedule can be offered to satisfy the user demand. The scheduling can be performed based on the selection index value and a higher priority is provided to a higher index value. The value of the total available resources can be determined based on the user demand. The schedule which is closer to the actual schedule of the user is offered by the system in subsequent time steps. If the system is not able to satisfy the demands of the user, then the user with the lowest selection index value can be removed and considered for negotiation based on the number of resources.

The negotiation based on the number of resources can be performed by considering the selection index and the user demand tuple. A reduction factor which determines the percentage reduction in the user requirement can be determined so that the demand of the user can be fulfilled. The value of the reduction factor can be chosen in such a way that a minimum resource allocation quantity is equivalent to a lowest unit of resource. The system enters into an iterative negotiation process with the user, where subsequent iterations offers number of resources closer to an actual user demand. If the system is not able to satisfy the demands of the user, then the user with the lowest selection index value can be removed and considered for negotiation based on the price of resources.

The negotiation based on the price of resources can be performed by considering the selection index and the user demand tuple. A cost factor, which determines the new per unit price of the resource to be allocated to the user, can be set. The value of the cost factor can be increased in each iteration and the process continues until the user demand is equal to the total availability. With the increase in unit price in successive iterations, the user can reduce the demand to 0 (i.e., to quit the negotiation process). The user with low values of the behavior coefficient can be considered as a greedy user and the user with high values are considered as a cooperative user. The greedy users tend to be less flexible in the negotiation process, while cooperative users are more flexible in the negotiation process. As a result, the cooperative users lead to a more efficient resource allocation process and in order to motivate the users to be more cooperative the behavior coefficient value can be assigned to each user depending on the user behavior. The user with higher values of behavior coefficient (i.e., cooperative users) can have higher probability of selection in future interactions, as compared to the user with lower values of behavior coefficient (i.e., greedy users). The multi-phase negotiation provides an efficient solution to the resource allocation problems by increasing the user satisfaction rate. The multi-phase negotiation mechanisms can be implemented by a virtual broker in an ACS marketplace.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., java, c++, etc.). The computer program code, however, for carrying out operations of the present invention may also be written in conventional procedural programming languages such as the "c" programming language or in a visually oriented programming environment such as, for example, visual basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
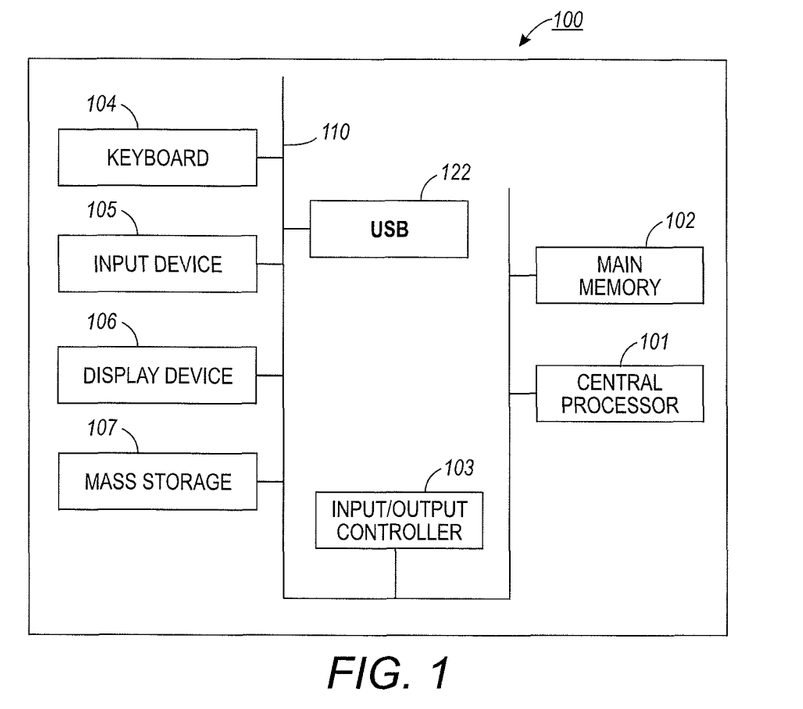
FIG. 1 illustrates a schematic view of a data-processing system, in which disclosed embodiments may be implemented.
Figure 2:
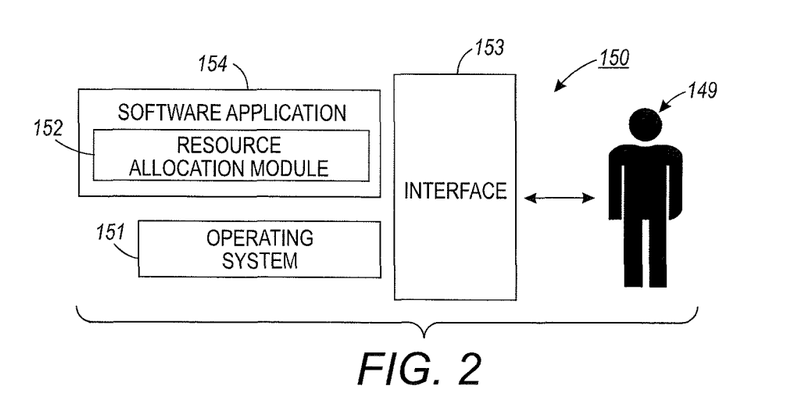
FIG. 2 illustrates a schematic view of a software system including a dynamic resource allocation module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that can include, for example, a central processor 101, a main memory 102, an input/output controller 103, a keyboard 104, an input device 105 (e.g., a pointing device such as a mouse, track ball, pen device, etc.), a display device 106, a mass storage 107 (e.g., a hard disk), and a USB (universal serial bus) peripheral connection 122. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, a dynamic resource allocation module 152 to constantly adjust the resource allocation based on fairness, throughput, and multi-phase negotiation mechanism. The dynamic resource allocation module 152 can include instructions such as those of method 400 discussed herein with respect to FIG. 4.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 3:
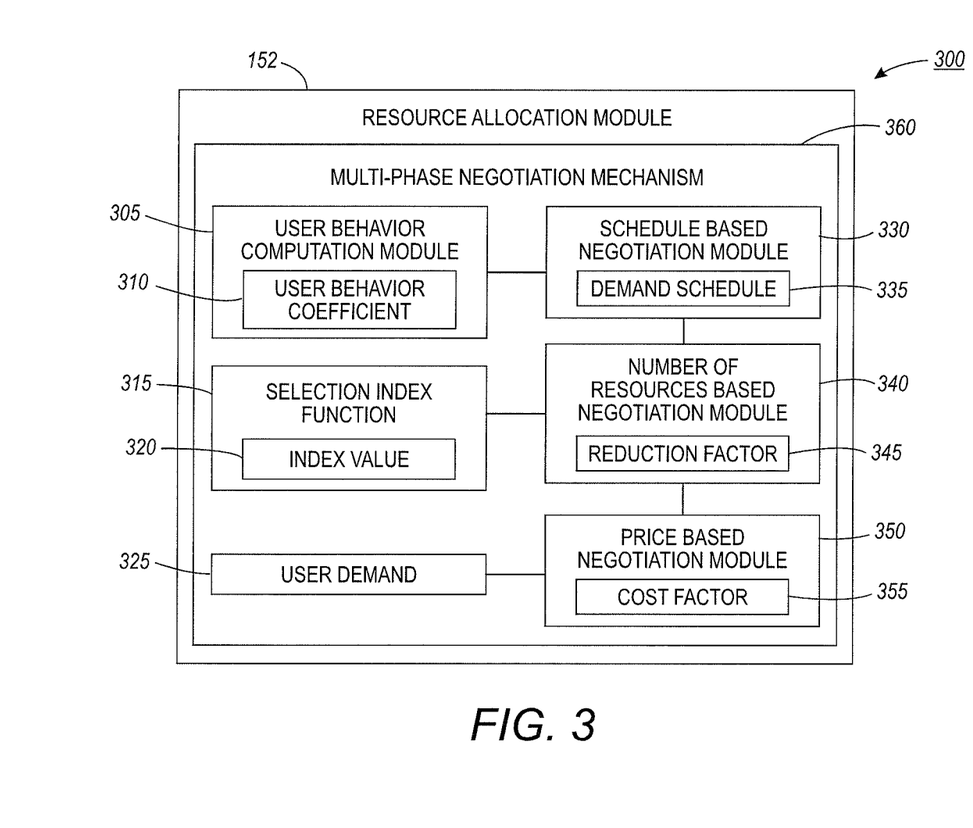
FIG. 3 illustrates a block diagram of a dynamic resource allocation system, in accordance with the disclosed embodiments.

FIG. 3 illustrates a block diagram of a dynamic resource allocation system 300, in accordance with the disclosed embodiments. Note that in FIGS. 1-8, identical or similar blocks are generally indicated by identical reference numerals. The dynamic resource allocation system 300 can be configured to include the dynamic resource allocation module 152 to constantly adjust the resource allocation based on multi-phase negotiation mechanism 360. The multi-phase negotiation mechanism 360 further includes a user behavior computation module 305, a schedule based negotiation module 330, a number of resources based negotiation module 340, and a price based negotiation module 350. A selection index function 315 computes an index value 320 in order to make a resource allocation decision.

The schedule based negotiation module 330 performs negotiation if a user requesting the resources for a low priority task using the selection index function 315, a user demand 325, and a demand schedule 335. The schedule based negotiation module 330 and/or the number of resources based negotiation module 340 performs the negotiation if the user demanding the resources for a medium priority task using the selection index function 315 and the user demand 325. The price based negotiation module 350 performs the negotiation if the user requesting resources for a high priority job utilizing the selection index function 315 and the user demand 325. A user behavior coefficient 310 with respect to a user can be computed to determine the degree of cooperativeness of the user with other users. The value of user behavior coefficient 310 can be updated each time it interacts with the system 300. The resource allocation system 300 provides a Pareto optimal solution without implementing market mechanisms and leads to high user satisfaction and retention rates.

Figure 4:
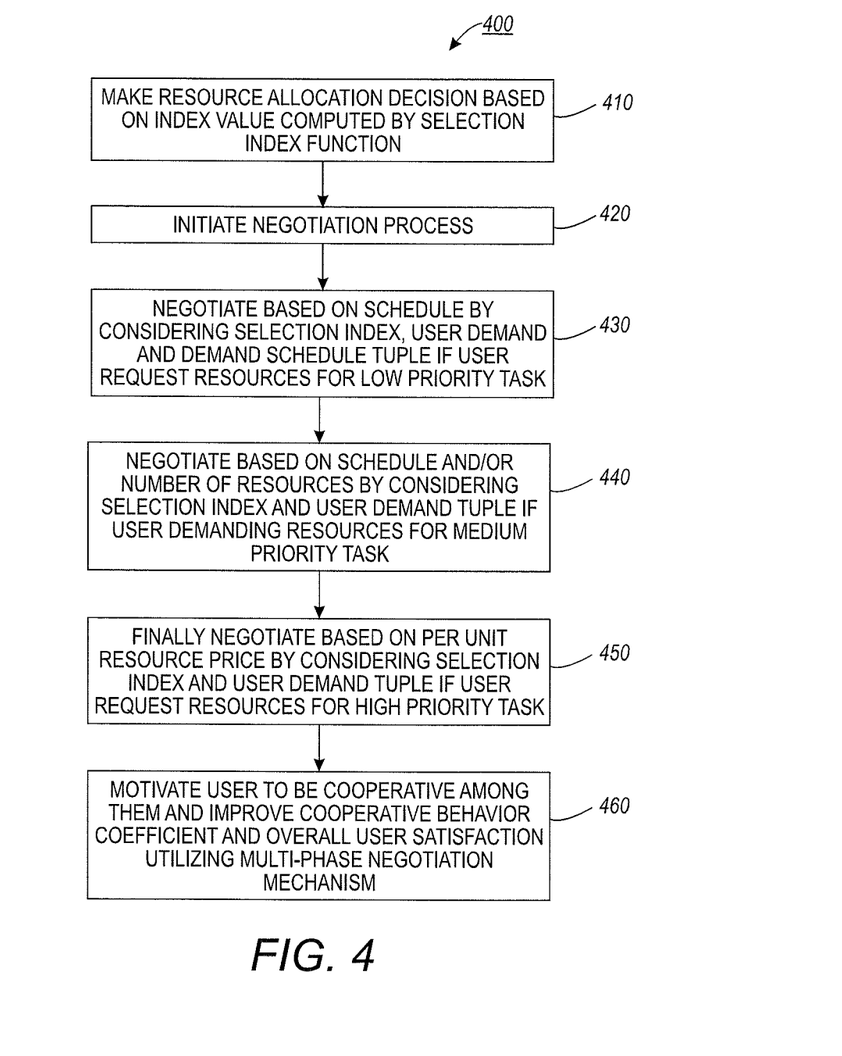
FIG. 4 illustrates a high level flow chart of operation illustrating logical operational steps of a method for dynamically allocating resources based on multi-phase negotiation mechanism, in accordance with the disclosed embodiments.

FIG. 4 illustrates a high level flow chart of operation illustrating logical operational steps of a method 400 for dynamically allocating resources based on the multi-phase negotiation mechanism 360, in accordance with the disclosed embodiments. Initially, a resource allocation decision can be made based on an index value computed by a selection index function, as indicated at block 410. For example, consider n users that can be represented as $(U_1, U_2 \ldots, U_x \ldots, U_n)$ and the corresponding demands at each time step can be represented by $((d_1, d_2 \ldots, d_x \ldots, d_n)^1, (d_1, d_2 \ldots, d_x \ldots, d_n)^2, \ldots, (d_1, d_2 \ldots, d_x \ldots, d_n)^T)$, wherein T is the total number of time steps. The resource allocation decisions can be made by the system 300 based on the index values 320 computed by the selection index function 315 as shown in equation (2) below:

$$SI^j(x) = \frac{\alpha_f^j\left(1 - \frac{w_x}{t}\right) + \alpha_\tau^{1-i}\left(1 - \frac{d_x}{d_{max}}\right) + \beta_x^S(t-1) + \frac{\beta_x^U(t-1) + \beta_x^P(t-1)}{2}}{} \quad (2)$$

wherein the term $$\left(1 - \frac{w_x}{t}\right)$$

introduces the notion of fairness which restricts the system 300 from allocating the resources to same user repetitively and the term $$\left(1 - \frac{d_x}{d_{max}}\right)$$

introduces the notion of (high) system throughput. The definitions of symbol used in equation (2) are illustrated in Table 1.

TABLE 1

| Symbol | Definition |
| --- | --- |
| $\alpha_f$ | Fairness coefficient, $\alpha_f \in [0, 1]$ |
| $\alpha_t$ | Throughput coefficient, $\alpha_t \in [0, 1]$ |
| $\beta_x^S(t-1)$ | Avg. Behavior coefficient value for $U_x$ for $1^{st}$ negotiation phase, at $(t-1)^{th}$ time step |
| $\beta_x^U(t-1)$ | Avg. Behavior coefficient value for $U_x$ for $2^{nd}$ negotiation phase, at $(t-1)^{th}$ time step |
| $\beta_x^P(t-1)$ | Avg. Behavior coefficient value for $U_x$ for $3^{rd}$ negotiation phase, at $(t-1)^{th}$ time step |
| $w_x$ | Number of times $U_x$ has won in past |
| t | Current trial number, $t \in T$ |
| T | Total number of trials |
| $d_x$ | Demand of $U_x$ |
| $d_{max}$ | Maximum demand of user $U_i \in U$, max $\{d_1, d_2 \ldots, d_i \ldots, d_n\}$ |

A negotiation process can then be performed, as depicted at block 420. A user requesting the resources for a low priority task can negotiate based on schedule by considering the selection index function 315, a user demand 325, and a demand schedule 335, as illustrated at block 430. The first phase of negotiation starts with offering new schedule to each user. In this phase of negotiation, the tuple for selection index 315, user demand 325, and demand schedule 335 can be considered as $(SI(x), d_x, s_x)$ wherein $SI(_x)$ represents the selection index value for $U_x$, $d_x$ represents the corresponding demand of the user, and $s_x$ represents the user's demand schedule. The user's demand schedule can be explained as the number of resources required by a user within a specified time frame. In this step, the system 300 analyzes the actual schedule $[(s_1^I, s_2^I \ldots, s_x^I \ldots, s_n^I)]^i$ and offers $[(s_1^O, s_2^O \ldots, s_x^O \ldots, s_n^O)]^i$ as a new schedule, which can satisfy the demands of all users. The scheduling can be done based on the selection index values and higher priority is given to higher Index value. The process is iterative where a new offer can be made at $i^{th}$ time step if the user hadn't accepted the offer at $(t-1)^{th}$ time step.

In $i^{th}$ iteration $\{m:m \le n\}$ is maximized wherein the users can be represented as $[(SI(1), d'_1, s_1^F), (SI(2), d'_2, s_2^F) \ldots, (SI(x), d'_x, s_x^F) \ldots, (SI(m), d'_m, s_m^F)]_i$ subject to $$\sum_{i=0}^{m} d'_i \le \frac{R * \omega}{100},$$

wherein R represents the total available resources, $\omega$ represents allocation factor, and $d'_i$ is the new demand of $U_i$ corresponding to $s_i^F$. The value of $\omega$ can be determined according to the user demand, i.e., if the user demand D>>R then the value of $\omega$ is more. The user behavior coefficient value for $U_x$ at $t^{th}$ time step of this negotiation phase is calculated as shown below in equation (3):

$$\dot{\beta}_x^S(t) = \frac{s_x^F - s_x^I}{s_x^O - s_x^I} \quad (3)$$

The term $\dot{\beta}_x^s(t)$ represents the user behavior coefficient value for $U_x$ at $t^{th}$ trial, which can be employed for calculating average value of behavior coefficient for $U_x$ at $t^{th}$ trial i.e.

$$\beta_x^S(t) = \frac{\sum_{j=1}^{t} \beta_x^S(j)}{t}$$

can be employed for calculating the selection index value for $U_x$ at $(t+1)^{th}$ trial. For example, assume the system 300 is able to successfully negotiate with $m_s$ users and the schedule at the end of the phase is $\{s_1^F, s_2^F \ldots, s_x^F \ldots, s_m^F\}$ and the users are not considered in the following negotiation phases (i.e. $\beta_x^U(t)=0$, $\beta_x^P(t)=0$ $\forall$ $x \in m_s$). Moreover, the behavior coefficient value of remaining $(n-m_1 S)$ users for this negotiation phase is 0 i.e. $\beta_x^s(t)=0$ $\forall$ $x \notin m_s$. The definitions of symbol used in equation (3) are illustrated in Table 2.

TABLE 2

| Symbol | Definition |
|---|---|
| $s_x^I$ | Original schedule of $U_x$ |
| $s_x^O$ | Schedule offered to $U_x$ by system |
| $s_x^F$ | Final schedule of $U_x$ after negotiation |
| $\omega$ | Allocation factor decides % age of total resources which could be allocated in this |
| $\beta_x^S(t)$ | Avg. behavior coefficient of $U_x$ for 1st phase of negotiation |

In subsequent time steps, the system 300 offers schedule which is closer to the actual schedule of the user and if the system is not able to satisfy the demands of all users, then users with the lowest selection index value 320 can be removed from this phase of negotiation and they are considered for negotiation in the next phase, where negotiation is done based on the number of resources 340.

The negotiation can be performed based on schedule and the number of resources by considering the selection index function 315 and the user demand 325 if user demanding resources for medium priority task, as depicted at block 440. The selection index 315 and user demand tuple 325 can be represented as $(SI(x), d_x)$, wherein $SI(x)$ represents selection index value, and $d_x$ represents the corresponding demand of the user.

The reduction factor, $\gamma$ which determines the percentage reduction in users' requirements, can be determined so that demands of all users (in this phase) can be fulfilled. The value of $\gamma$ is chosen in such a way that minimum resource allocation quantity is equivalent to lowest unit of resource i.e. $\min_{1 \leq x \leq n} (d'_x) = r$, where $d'_x$ represents new demand of user calculated using reduction factor and r represents lowest unit of resource (to be allocated). So, the resources offered to users in first iteration are $$\left\{ \frac{\gamma * d_1}{100}, \frac{\gamma * d_2}{100} \ldots, \frac{\gamma * d_x}{100} \ldots, \frac{\gamma * d_m}{100} \right\}.$$

It is also an iterative process where a new offer is made at $i^{th}$ time step if the user did not accept the previous offer at $(t-1)^{th}$ time step.

In $i^{th}$ iteration $\{m:m \leq (n-m_s)\}$ is maximized where the users are represented as $[(SI(1), d'_1), (SI(2), d'_2) \ldots, (SI(x), d'_x) \ldots, (SI(n-m_s), d'_{(n-m_s)})]^i$ subject to $$\sum_{i=o}^{m} d'_i \leq R,$$

wherein R represents total available resources and $d'_i$ is the new demand of $U_i$ calculated using reduction factor. The value of behavior coefficient for $U_x$ at $t^{th}$ trial is calculated as shown in equation (4) below:

$$\dot{\beta}_x^U(t) = \frac{d_x - d'_x}{d_x \left(1 - \frac{\gamma}{100}\right)} \quad (4)$$

Term $\dot{\beta}_x^U(t)$ represents the user behavior coefficient value for $U_x$ at $t^{th}$ trial, which is employed for calculating an average value of the behavior coefficient for $U_x$ at $t^{th}$ trial i.e.

$$\beta_x^U(t) = \frac{\sum_{j=1}^{t} \dot{\beta}_x^U(j)}{t}$$

and it is used for calculating the selection index value for $U_x$ at $(t+1)^{th}$ trial. For example, assume the system 300 is able to successfully negotiate with $m_u$ users and their demand at the end of this phase is $\{d'_1, d'_2, \ldots, d'_x \ldots, d'_m\}$ and these users are not considered in next negotiation phase i.e. $\beta_x^P(t)=0$ $\forall$ $x \in m_U$. Moreover, the behavior coefficient value for remaining $(n-m_1 U)$ users for this negotiation phase is 0 i.e. $\beta_x^U(t)=0$ $\forall$ $x \notin m_U$. The definitions of symbol used in equation (4) are illustrated in Table 3.

TABLE 3

| Symbol | Definition |
|---|---|
| $d_x$ | Original demand of usr |
| $d_x'$ | Demand of $U_x$ at the end of $2^{nd}$ phase of negotiation |
| $\gamma$ | Reduction factor |
| $\beta_x^U(t)$ | User behavior coefficient for $2^{nd}$ phase of negotiation |

The system 300 enters into an iterative negotiation process with users, where subsequent iterations offers number of resources closer to actual user demand. As discussed in the previous phase, if the system 300 is not able to satisfy the demands of all users, then users with the lowest selection index value are removed from this phase of negotiation and they are considered for negotiation in the next phase, where negotiation is done based on price of resources.

Finally, the negotiation can be performed based on per unit resource price by considering the selection index function 315 and the user demand 325 if user requesting resources for high priority task, as indicated at block 450. The next phase of the negotiation process includes negotiating on the basis of price of resources 350. In this phase of negotiation process 350, the selection index 315 and user demand tuple 325 is considered i.e. $(SI(x), d_x, p_x)$, wherein $SI(x)$ represents selection index value, $d_x$ represents the corresponding demand of the user, and $p_x$ represents the actual price of the resource. This phase begins with setting $\delta$ (i.e., cost factor), which determines the new per unit price of the resource to be allocated to users.

The value of $\delta$ is increased in each iteration and this process continues till user demand is equal to total availability. With the increase in unit price in successive iterations, the users can reduce their demand and some can even reduce their demand to 0 (i.e., they quit the negotiation process). For example, assume the value of $\delta$ at $i^{th}$ time step reaches a point, where the reduction of user demand is such that the total user demand becomes lesser than total availability of resources $$\text{i.e.} \sum_{i=o}^{x} d'_i < R,$$

where x is the number of users in negotiation process after $i^{th}$ time step and R is the total availability of resources. In that case the value of $\delta$ is reduced to the value at $(t-1)^{th}$ time step and higher priority is given to the users with higher values of selection index during resource allocation.

In $i^{th}$ iteration $\{m : m \le (n - m_s - m_U)\}$ is maximized where users are represented as $[(SI(1), d'_1, p_1), (SI(2), d'_2, p_2), \ldots, (SI(x), d'_x, p_x), \ldots, (SI(n-m_s-m_U), d'_{(n-m_s-m_U)}, p_{(n-m_s-m_U)})]^i$ subject to $$\sum_{i=o}^{m} d'_i \le R,$$

wherein R represents the total available resources and $d'_i$ represents the new demand of $U_i$ corresponding to new per unit price. The value of behavior coefficient for $U_x$ in $t^{th}$ trial is calculated as indicated in equation (5) below:

$$\mathring{\beta}_x^P(t) = \frac{\delta}{100} * \frac{d'_x}{d_x} \quad (5)$$

Term $\mathring{\beta}_x^P(t)$ represents user the behavior coefficient value for $U_x$ at $t^{th}$ trial, which is used for calculating average value of behavior coefficient for $U_x$ at $t^{th}$ trial i.e.

$$\beta_x^P(t) = \frac{\sum_{j=1}^{t} \mathring{\beta}_x^P(j)}{t}$$

and it is used for calculating the selection index value for $U_x$ at $(t+1)^{th}$ trial. For example, assume the system 300 is able to successfully negotiate with $m_p$ users and their demand at the end of this phase is $\{d'_1, d'_2, \ldots, d'_x, \ldots, d'_{m_l}\}$ and the behavior coefficient value for remaining $(n-m_p)$ users is 0 i.e.

$\beta_x^P(t)=0 \ \forall \ x \notin m_p$. $\beta_x^U(t)=0 \ \forall \ x \notin m_U$. The definitions of symbol used in equation (5) are illustrated in Table 4.

TABLE 4

| Symbol | Definition |
| --- | --- |
| $d_x$ | Original demand of user |
| $d_x'$ | Demand of $U_x$ at the end of $3^{rd}$ phase of negotiation |
| $\delta$ | Cost factor |
| $\beta_x^P(t)$ | User behavior coefficient for $3^{rd}$ phase of negotiation |

The users with low values of the behavior coefficient are considered as greedy users and those with high values are considered as cooperative users. The greedy users tend to be less flexible in the negotiation process, while cooperative users are more flexible in the negotiation process. As a result, cooperative users lead to a more efficient resource allocation process and in order to motivate users to be more cooperative, the behavior coefficient value is assigned to each user depending on the behavior. The users with higher values of behavior coefficient (i.e., cooperative users) can have higher probability of selection in future interactions as compared to users with lower values of behavior coefficient (i.e., greedy users). The multi-phase negotiation mechanism 360 motivates the users to be cooperative among them and improves a cooperative behavior coefficient and an overall user satisfaction rate, as shown at block 460.

The multi-phase negotiation mechanism 360 offers an efficient solution to the resource allocation problems which aims at increasing the user's satisfaction rate. The effectiveness of the multi-phase negotiation mechanism 360 can be tested in scenarios where D>>R, wherein D is total user demand and R is the total resource availability. The multi-phase negotiation mechanism 360 encourages the users to be cooperative among them using one of the three negotiation mechanisms according to their priority of tasks. The resource allocation system 300 increase the user satisfaction rate and motivates the users to be more cooperative among them which results in the overall increase in user's satisfaction rate. The increase in the user satisfaction leads to higher user retention which in turn increases the ACS's revenue.

Figure 5:
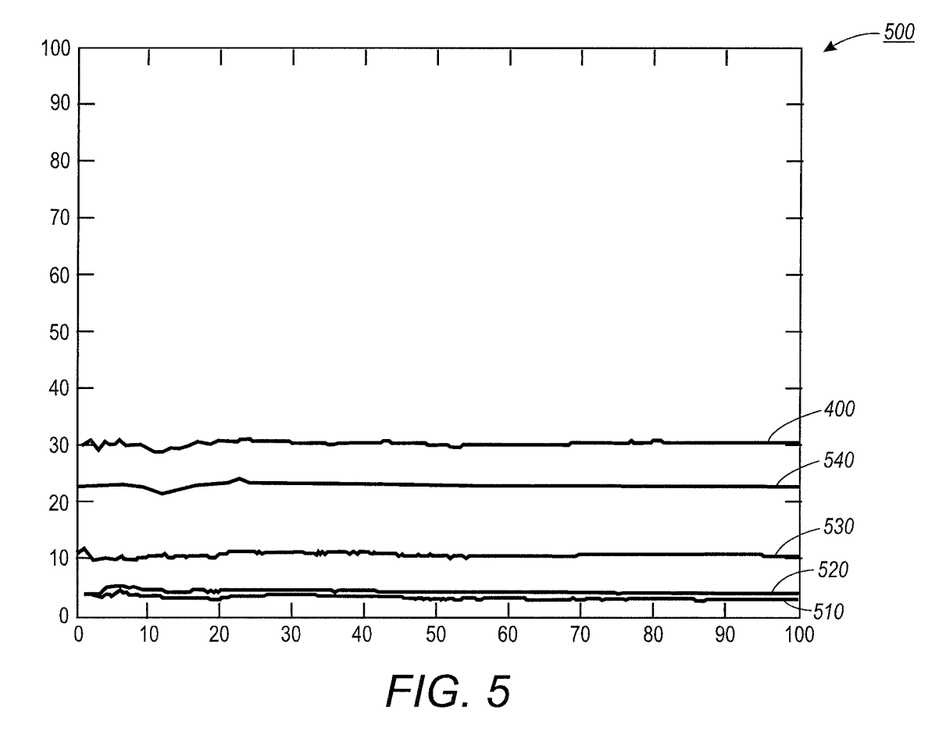
FIGS. 5-6 illustrate a graph depicting data indicative of percentage of satisfied users with respect to various resource allocation approaches, in accordance with the disclosed embodiments.
Figure 6:
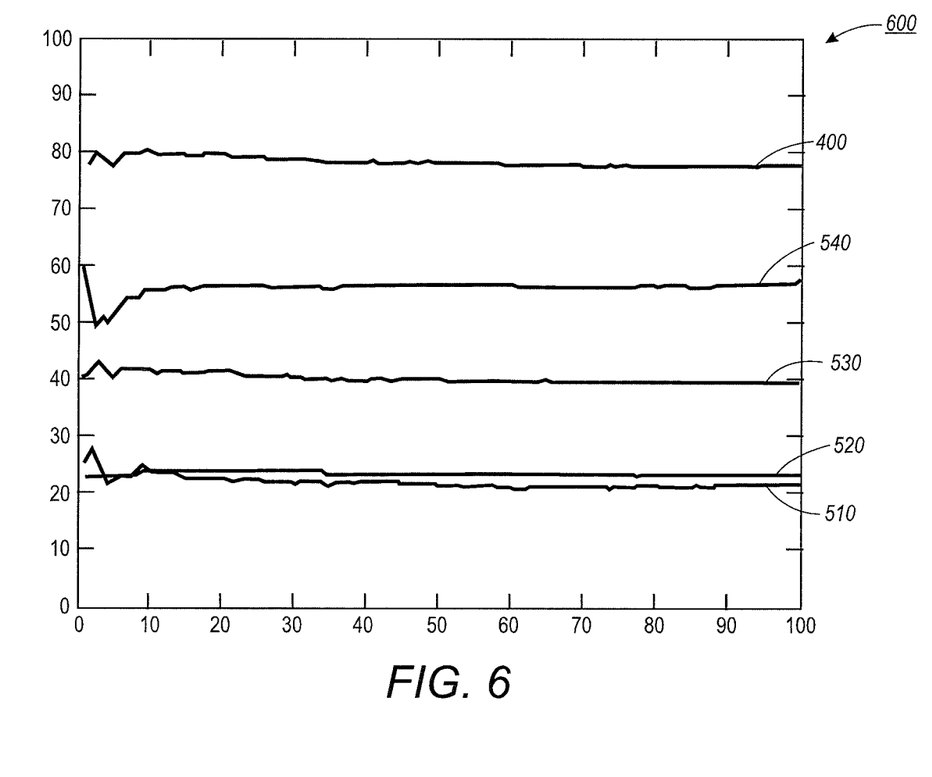

FIGS. 5-6 illustrate a graph 500 and 600 depicting data indicative of percentage satisfied users, in accordance with the disclosed embodiments. The user satisfaction with respect to the allocation method 400 is compared with different allocation approaches, for example, even distribution 510, highest priority first 520, first come first serve 530, and fair allocation 540. The user satisfaction rate is directly proportional to throughput of an algorithm as higher is the number of satisfied users more is the retention rate. As the user waiting time is inversely proportional to the fairness of an algorithm the lower is the waiting time for the user (for getting a resource) the more is the fairness. The test case scenarios for analyzing the user satisfaction rate and user waiting time in different resource allocation algorithms are illustrated in TABLE 5.

TABLE 5

| Test Case | # Resources | # Users | Min. Demand/User | Max. Demand/User | # Trials |
| --- | --- | --- | --- | --- | --- |
| Case 1 | 100 | 50 | 1 | 60 | 100 |
| Case 2 | 100 | 50 | 1 | 10 | 100 |

FIGS. 5-6 illustrate the user satisfaction rates for case 1 and case 2 respectively. The user satisfaction rate in FIG. 6 is more than previous case because the maximum demand of a single user can be 10 and total resource availability is 100. Table 6 shows the average statistics for the user satisfaction rate in the test scenarios.

TABLE 6

| Algorithm | Avg. Satisfied | Avg. Dissatisfied Case 1 | % Satisfied | Avg. Satisfied | Avg. Dissatisfied Case 2 | % Satisfied |
|---|---|---|---|---|---|---|
| Even Distribution | 1.68 | 48.32 | 3.36% | 10.65 | 39.35 | 21.3% |
| First Come First Serve | 5.54 | 44.46 | 11.08% | 19.56 | 30.44 | 39.12% |
| Highest Priority First | 2.3 | 47.7 | 4.6% | 11.31 | 38.69 | 22.62% |
| Fair Allocation | 11.56 | 38.44 | 23.12% | 28.59 | 21.41 | 57.18% |
| Our Proposed Method | 15.41 | 34.59 | 30.82 | 39.11 | 10.89 | 78.22% |

The analysis of the satisfaction rates on the basis of above statistics implies that the percentages of satisfied users are more in the allocation method 400 as compared to other approaches. The fairness component of the resource allocation approach 400 i.e.

$$\left(1 - \frac{w_x}{t}\right)$$

accounts for higher user satisfaction rate and at the same time throughput component balances it depending on the value of throughput coefficient, thus achieving optimal fairness and throughput in the resource allocation.

Figure 7:
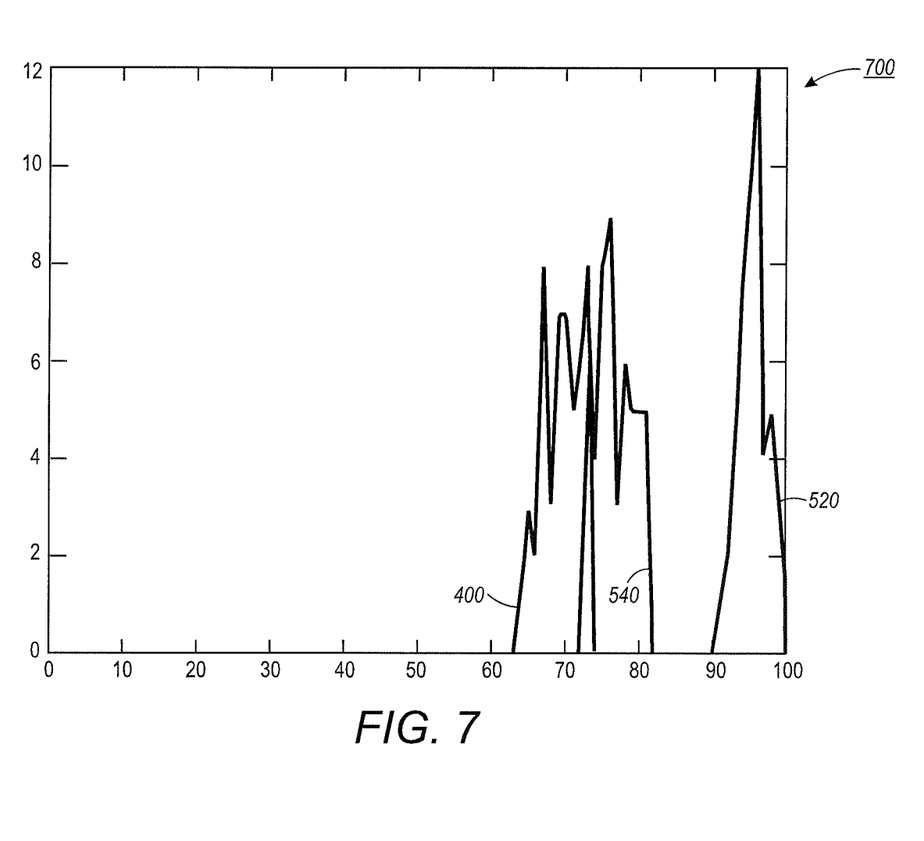
FIGS. 7-8 illustrate a graph depicting data indicative of user waiting time with respect to various resource allocation approaches, in accordance with the disclosed embodiments.
Figure 8:
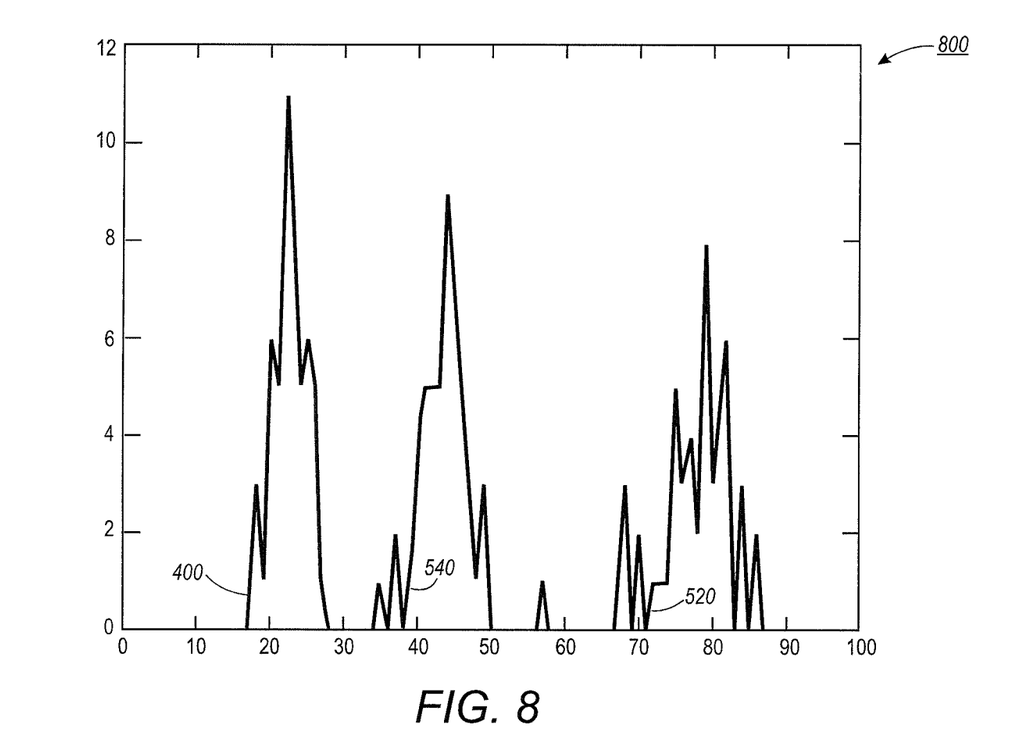

FIGS. 7-8 illustrate graphs 700 and 800, which depict data indicative of user waiting time, in accordance with the disclosed embodiments. Tables 7 and 8 respectivley correspond to Test cases 1 and 2 respectively.

TABLE 7

| Algorithm | Min Wait Time | Max Wait Time | Avg. Wait Time | Std. Dev. Wait Time |
|---|---|---|---|---|
| Even Distribution | 0 | 99 | 26.42 | 14.69 |
| FCFS | 0 | 99 | 25.29 | 21.96 |
| HPF | 0 | 82 | 19.97 | 8.72 |
| Fair Allocation | 0 | 24 | 3.22 | 0.4 |
| Our Proposed Method | 0 | 21 | 2.2 | 0.28 |

TABLE 8

| Algorithm | Min Wait Time | Max Wait Time | Avg. Wait Time | Std. Dev. Wait Time |
|---|---|---|---|---|
| Even Distribution | 0 | 38 | 3.68 | 0.94 |
| FCFS | 0 | 99 | 28.29 | 36.76 |
| HPF | 0 | 24 | 3.47 | 0.9 |
| Fair Allocation | 0 | 8 | 0.74 | 0.09 |
| Our Proposed Method | 0 | 5 | 0.28 | 0.04 |

The users' waiting time in case of the allocation method 400 is much less than other approaches which implies the resource allocation method 400 is comparatively fairer. The user's waiting time with respect to the allocation method 400 is compared with different allocation approaches, for example, highest priority first 520 and fair allocation 540.

FIGS. 7-8 illustrate the total waiting time for users is lesser in the allocation method 400 as compared to the highest priority first 520 and the fair allocation 540 for both scenarios. This signifies that deviation between users' waiting time in case of the resource allocation method 400 is lesser than traditional resource allocation method 520 and 540 and it guarantees envy free allocation.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A computer-implemented method for dynamically allocating resources in a process, said computer-implemented method comprising:
   computing, by a user behavior computation module, a behavior coefficient of each user of a plurality of users to determine a degree of cooperativeness of each user with respect to said plurality of other users, wherein each user is associated with a task;
   computing, by a selection index function, an index value of each task associated with each user, wherein the index value is based in part on the behavior coefficient of said user of each task;
   performing a multi-phase negotiation utilizing negotiation mechanisms in response to a user of the plurality of users requesting a resource for a task including:
      a schedule based negotiation mechanism when said index value of said task is low;
      a schedule based negotiation mechanism or a number of resources based negotiation when said index value of said task is medium;
      a price based negotiation mechanism when said index value of said task is high; and
   dynamically allocating said resource based on said behavior coefficient and said multi-phase negotiation.

2. The computer-implemented method of claim 1 further comprising performing said schedule based negotiation mechanism if said request for said resource comprises a request for a low priority task by considering a selection index, said each user demand, and a demand schedule tuple.

3. The computer-implemented method of claim 2 further comprising:
   analyzing an actual schedule and offering a new schedule to satisfy said each user demand and provide a higher priority to a higher index value;
   determining a total available resource value based on said each user demand; and removing a user with a lowest selection index value of said plurality of users and thereafter considering said user with said lowest selection index value for said number of resources based negotiation process if said user with said lowest selection index value demand is not satisfied.

4. The computer-implemented method of claim 1 further comprising performing said schedule based negotiation mechanism said number of resources based negotiation mechanism if said request for said resource comprises a request for a medium priority task by considering said selection index and said user demand tuple.

5. The computer-implemented method of claim 4 further comprising:
    determining a reduction factor that determines a percentage reduction in said each user requirement in order to fulfill said each user demand wherein said reduction factor value is chosen in such a way that a minimum resource allocation quantity is equivalent to a lowest unit of resource;
    entering into an iterative negotiation process with said each user wherein a subsequent iteration offers a number of resources closer to an actual user demand; and
    removing a user with said lowest selection index value and thereafter consider said user with said lowest selection index value for said price based negotiation mechanism if said user with said lowest selection index value demand is not satisfied.

6. The computer-implemented method of claim 1 further comprises performing a price based negotiation process if said request for said resource comprises a request for a high priority task by considering said selection index and a user demand tuple.

7. The computer-implemented method of claim 6 further comprising:
    setting a cost factor that determines a new per unit price of said resource and thereafter increase said cost factor value in each iteration of said multi-phase negotiation until said each user demand is equal to a total availability; and
    considering a user of said plurality of users with a low value of said user behavior coefficient as a greedy user and a user with a high value of said user behavior coefficient as a cooperative user.

8. The computer-implemented method of claim 7 further comprising assigning said user behavior coefficient value to each user of said plurality of users depending on said behavior in order to motivate said each user to be more cooperative for efficiently allocating said resource.

9. The computer-implemented method of claim 7 wherein said cooperative user possesses a higher probability of selection in a future interaction as compared to said greedy user.

10. A system for dynamically allocating resources in a process, said system comprising:
    a processor; and
    a computer-usable medium embodying computer code, said computer-usable medium being coupled to said data bus, said computer program code comprising instructions executable by said processor and configured for:
        computing, by a user behavior computation module, a behavior coefficient of each user of a plurality of users to determine a degree of cooperativeness of said each user with respect to said plurality of users, wherein each user is associated with a task;
        computing, by a selection index function, an index value of the task associated with each user, wherein the index value is based in part on the behavior coefficient of said each user of each task;
        performing a multi-phase negotiation utilizing negotiation mechanisms in response to a user of the plurality of users requesting resource for a task including:
            a schedule based negotiation mechanism when said index value of said task is low;
            a schedule based negotiation mechanism or a number or resources based negotiation when said index value of said task is medium;
            a price based negotiation mechanism when said index value of said task is high; and
        dynamically allocating said resource based on said behavior coefficient and said multi-phase negotiation.

11. The system of claim 10 wherein said instructions are further configured for performing said schedule based negotiation mechanism if said request for said resource comprises a request for a low priority task by considering a selection index, said each user demand, and a demand schedule tuple.

12. The system of claim 11 wherein said instructions are further configured for:
    analyzing an actual schedule and offering a new schedule to satisfy said each user demand and provide a higher priority to a higher index value;
    determining a total available resource value based on said each user demand; and
    removing a user with a lowest selection index value of said plurality of users and thereafter considering said user with said lowest selection index value for said number of resources based negotiation process if said user with said lowest selection index value demand is not satisfied.

13. The system of claim 10 wherein said instructions are further configured for performing said schedule based negotiation mechanism said number of resources based negotiation mechanism if said request for said resource comprises a request for a medium priority task by considering said selection index and said user demand tuple.

14. The system of claim 13 wherein said instructions are further configured for:
    determining a reduction factor that determines a percentage reduction in said each user requirement in order to fulfill said each user demand wherein said reduction factor value is chosen in such a way that a minimum resource allocation quantity is equivalent to a lowest unit of resource;
    entering into an iterative negotiation process with said each user wherein a subsequent iteration offers a number of resources closer to an actual user demand; and
    removing a user with said lowest selection index value and thereafter consider said user with said lowest selection index value for said price based negotiation mechanism if said user with said lowest selection index value demand is not satisfied.

15. A non-transitory processor-readable medium storing code representing instructions to cause a processor to perform a process for dynamically allocating resources in a process, said code comprising code to:
    compute, by a user behavior computation module, a behavior coefficient of each user of a plurality of users to determine a degree of cooperativeness of said each user with respect to said plurality of users;
    compute, by a selection index function, an index value of the task associated with each user, wherein the index value is based in part on the behavior coefficient of said each user of each task;

perform a multi-phase negotiation utilizing negotiation mechanisms in response to a user of said plurality of users requesting resource for a task including:
- a schedule based negotiation mechanism when said index value of said task is low;
- a schedule based negotiation mechanism or a number or resources based negotiation when said index value of said task is medium;
- a price based negotiation mechanism when said index value of said task is high; and dynamically allocate said resource in based on said behavior coefficient and said multi-phase negotiation.

* * * * *